S. BRALOVE.
PIN FASTENING DEVICE.
APPLICATION FILED MAR. 14, 1918.
1,297,995.
Patented Mar. 25, 1919.
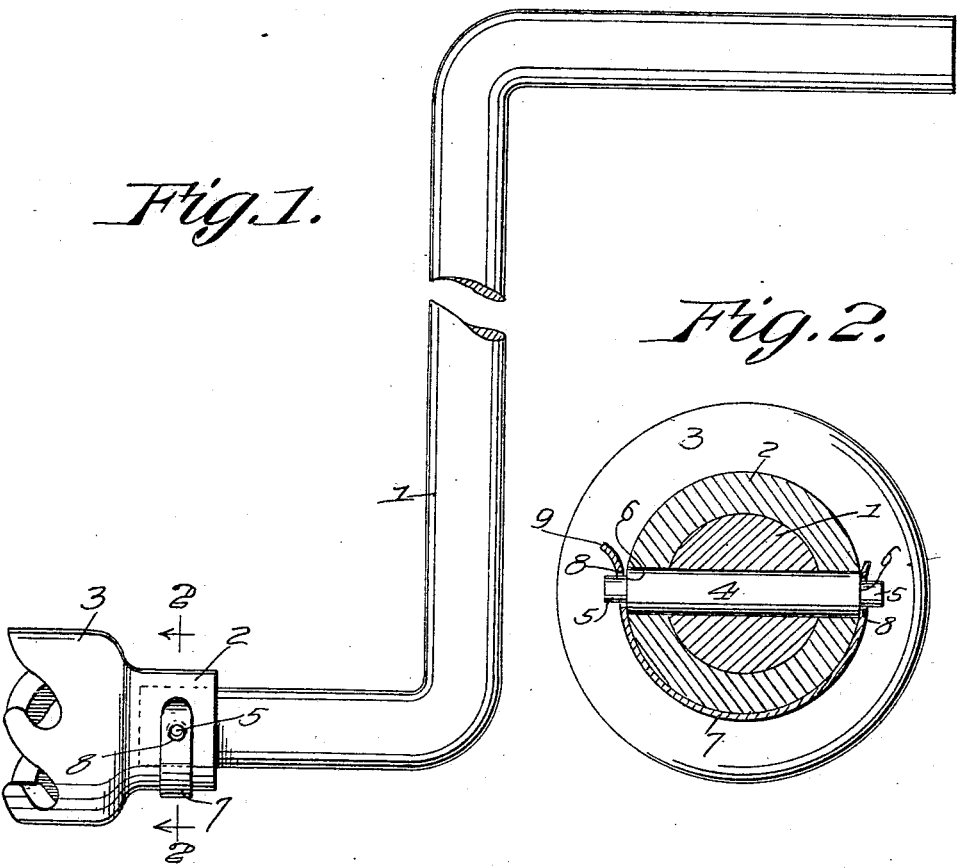
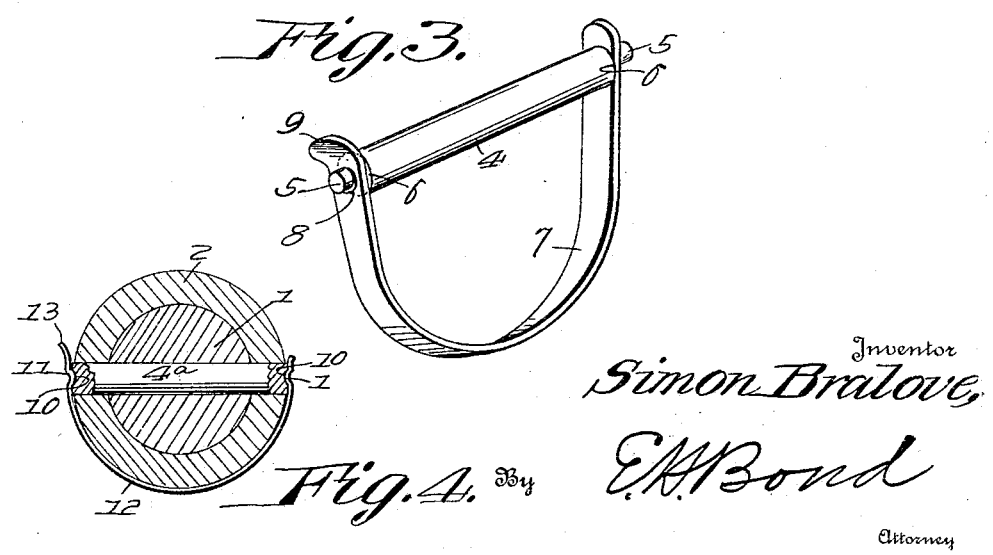
Inventor
Simon Bralove,
By E. H. Bond
Attorney

UNITED STATES PATENT OFFICE.

SIMON BRALOVE, OF WASHINGTON, DISTRICT OF COLUMBIA.

PIN-FASTENING DEVICE.

1,297,995.  Specification of Letters Patent.  Patented Mar. 25, 1919.

Application filed March 14, 1918. Serial No. 222,522.

*To all whom it may concern:*

Be it known that I, SIMON BRALOVE, a citizen of the United States, residing at Washington, in the District of Columbia, have invented certain new and useful Improvements in Pin-Fastening Devices, of which the following is a specification.

This invention relates to means for securing a pin against displacement and while more especially designed for holding the pin which secures the crank of the starter of an automobile and is thus herein illustrated, it will be evident, as the description proceeds, that the same is applicable for other uses and in other connections.

As is well known, the pins which secure the crank in position in the sockets of the starters, particularly in Ford machines, often become displaced and it is difficult to insert and head a new one, owing to the inaccessibility of the ends of the same, requiring special implements to properly and satisfactorily replace and secure a pin in position.

The present invention has for its objects among others to provide a simple and efficient means for holding the pin, and one which can be quickly and expeditiously applied by any one upon the road or elsewhere and not necessitating skilled labor or special implements.

Other objects and advantages of the invention will hereinafter appear and the novel features thereof will be particularly pointed out in the appended claims.

The invention, in its preferred forms, is clearly illustrated in the accompanying drawings, which, with the numerals of reference marked thereon, form a part of this specification, and in which—

Figure 1 is an elevation with a portion of the crank broken away, showing the application of my improvement.

Fig. 2 is an enlarged section on the line 2—2 of Fig. 1, looking in the direction of the arrows.

Fig. 3 is a perspective view of the pin removed, showing the fastener applied.

Fig. 4 is a cross section with portions broken away, showing another embodiment of the invention.

Like numerals of reference indicate like parts throughout the several views.

Referring to the drawings, 1 designates a member which, in the present instance, is shown as the crank of an automobile and 2 the coöperating member, which, in the present instance, is shown as the socket of the ratchet portion 3 of a starter.

The members 1 and 2 are ordinarily secured by a pin 4. As seen in Figs. 1, 2 and 3, this pin is provided at each end with a reduced portion 5 forming the shoulders 6.

In practice, the pin is passed through coincident openings in the socket member 2 and in the member 1, the reduced portions 5—5 extending beyond the periphery of the socket member, as shown best in Fig. 2, and then the fastening member 7 is applied. This fastening member is formed of spring metal of substantially U-shape, as seen in Figs. 1, 2 and 3, the bowed part being adapted to snugly embrace the adjacent face of the socket member 2, as shown clearly in Fig. 2, and at each end the bowed member 7 is provided with an opening 8, as illustrated, one end of the spring being slightly extended, as at 9, to form a thumb-piece or the like for the easier manipulation of the fastener. The ends of the spring are bowed outward so as to engage the openings 8 over the reduced portions 5 of the pin and then pressure is removed from the end or ends of the spring and the same, through its resiliency, springs back into its normal position, as illustrated in Fig. 2. The walls of the openings in the ends of the spring, bearing on the reduced portions 5, and the end portions of the spring extending at an angle, form clutch members which firmly clutch the reduced portions, and any tendency of the end or ends of the spring to move outward only serves to cause the fastener to more firmly bite upon the reduced portions and form a more positive clutch. Endwise movement of the pin cannot cause disengagement thereof, but, when it is desired to remove the pin for any purpose, pressure is applied to the extension 9 so as to force that end of the spring off the reduced portion 5 of the pin, when the latter can be readily removed. It is to be noted that the ends of the spring have a bearing at one point against the shoulders 6, while the opposite walls of the openings in the ends of the spring frictionally bear against the reduced portions to constitute the clutch.

In Fig. 4 I have shown another embodiment of the invention in which the pin 4ª is passed through the members 1 and 2 and the ends thereof are provided with depressions 10 into which spring teats or the like 11 formed on the U-shaped spring fastener 12, one end of said fastener being extended to form a thumb-piece 13 for the same purpose as the thumb-piece 9 in the form just described. In practice, the function and operation are substantially the same as in the form previously described. The teats and depressions form friction clutches and any tendency of the pin to move endwise serves to increase the clutch action.

Modifications in detail may be resorted to without departing from the spirit of the invention or sacrificing any of its advantages.

What is claimed as new is:—

1. A pin having end abutting faces to be engaged by the ends of a resilient bowed member, and a bowed spring member engageable at its ends with said abutting faces to prevent endwise displacement of the pin, said member having a body portion to closely frictionally engage the member through which the pin passes whereby the ends of the bowed member are held against the said abutting faces.

2. A pin having reduced end portions and adjacent shoulders, and a bowed spring member having a body portion to frictionally engage a member through which a pin passes and having openings to receive said reduced portions and by coöperation with said shoulders and reduced portions to form a clutch to prevent displacement of the pin.

In testimony whereof I affix my signature in the presence of two witnesses.

SIMON BRALOVE

Witnesses:
E. H. BOND,
M. A. BOND.

Copies of this patent may be obtained for five cents each, by addressing the "Commissioner of Patents. Washington, D. C."